Oct. 6, 1970

D. W. VAN DOORN ET AL 3,531,831

PROCESS AND APPARATUS FOR PLUCKING TUFTS OF
FIBERS FROM BALES THEREOF

Filed Oct. 2, 1967

INVENTOR.
Donald W. Van Doorn
Raymond M. Zoch
Robert L. Clarke By Jennings, Carter & Thompson
Attorneys United States Patent Office 3,531,831
Patented Oct. 6, 1970

3,531,831
PROCESS AND APPARATUS FOR PLUCKING
TUFTS OF FIBERS FROM BALES THEREOF
Donald W. Van Doorn, Raymond M. Zoch, and Robert
L. Clarke, Columbus, Ga., assignors to Lummus Cotton
Gin Company, a corporation of Georgia
Filed Oct. 2, 1967, Ser. No. 672,330
Int. Cl. D01g 7/08
U.S. Cl. 19—81                                            20 Claims

ABSTRACT OF THE DISCLOSURE

Process and apparatus for plucking tufts from one or more bales of fibers. Fiber pick-up means moves adjacent a surface of the bale in a direction parallel to the surface and removes fibers therefrom in a direction substantially perpendicular to the surface.

---

This invention relates to a process and apparatus for opening bales of fibers, such as cotton bales, by plucking relatively small tufts of fibers from the bales.

Heretofore in the art to which our invention relates, difficulties have been encountered in obtaining a uniform blend of the fibers from a plurality of bales of fibers due to the fact that the fibers are not removed in such a way as to obtain a complete cross section of the various conditions which exist throughout each bale. That is, it has been the usual practice to remove fibers across the top or bottom of bales, as the bale normally sets in the gin press, whereby the fibers are removed in the order or in the reverse order that the fibers are introduced into the gin press. While the fiber quality is uniform across the bale as it enters the press, the fiber quality may vary substantially from top to bottom of the bale due to many causes. Also, with conventional type blending feeders, the stock is often allowed to run out in one or more of the feeders thus destroying the uniformity of the blend. Furthermore, with conventional type pluckers operated from the bottoms of bales, there is a variable feed depending upon how much of the bale remains above the pluckers. Also, with the bale located above the pluckers, foreign articles, such as bale buckles, bale ties, bagging and the like that inadvertently are left on the bales cause great damage to the plucking heads, such as saws, and if the foreign objects move past the plucker heads, they move with the stock to thus cause damage to more costly machinery. Also, with conventional type opening equipment which employ saw teeth serving to hack or snag the fibers out of the bale, considerable fiber breakage and nepping results.

Brief summary of invention

In accordance with our invention, tufts of fibers are plucked from one or more bales of fibers with the fiber pick-up means traveling in a direction parallel to the surface from which the fibers are removed. The fibers are removed in a direction substantially perpendicular to the surface from which the fibers are removed whereby there is substantially no relative movement between the fibers being removed and the surface from which the fibers are removed in a direction parallel to the surface. Accordingly, the fibers are removed with a gentle, slow motion in a manner very similar to removal of the fibers by the thumb and forefinger. An object of our invention is to provide a process and apparatus of the character designated in which foreign objects left on the bales inadvertently or carried by the bales are rejected by our improved plucking mechanism whereby the foreign objects are left lying on the floor of the bin.

Another object of our invention is to provide apparatus wherein there is no twisting or sawing of the fibers from the bale whereby fiber breakage and nepping is reduced to a minimum.

Another object of our invention is to provide a process and apparatus of the character designated in which the plucker mechanism operates on top of the bales rather than underneath, thus not only preventing damage from foreign objects but also permitting the rate of feed to be accurately controlled to assure a constant output at all times.

A further object of our invention is to provide plucking mechanism which moves along several bales of fibers stacked snugly together in a compact bin with the bales being set on their sides whereby the layers of fibers forming the bale extend in a vertical plane parallel to the direction of movement of the plucking mechanism thus providing for a complete cross section of the various conditions throughout each bale.

A further object of our invention is to provide plucking mechanism which is adapted to accommodate different mixes and one in which the mixes may be readily changed thus providing for improved blending and mixing of samples taken from entire cross sections of each bale and providing flexibility in changing from one mix to another.

A further object of our invention is to provide apparatus for plucking and blending fibers in which the hazard of friction fires is reduced to a minimum.

A still further object of our invention is to provide apparatus for plucking and blending fibers of the character designated which shall be simple of construction, economical of manufacture, require a minimum of floor space and require a minimum of labor for operating the same.

Apparatus embodying features of our invention is illustrated in the accompanying drawings, forming a part of this application, in which:

FIG. 6 is an enlarged, fragmental view, partly broken away, showing the plucking unit and the means for reversing the direction of travel thereof;

Figures 1, 2, 3, 4, 5:
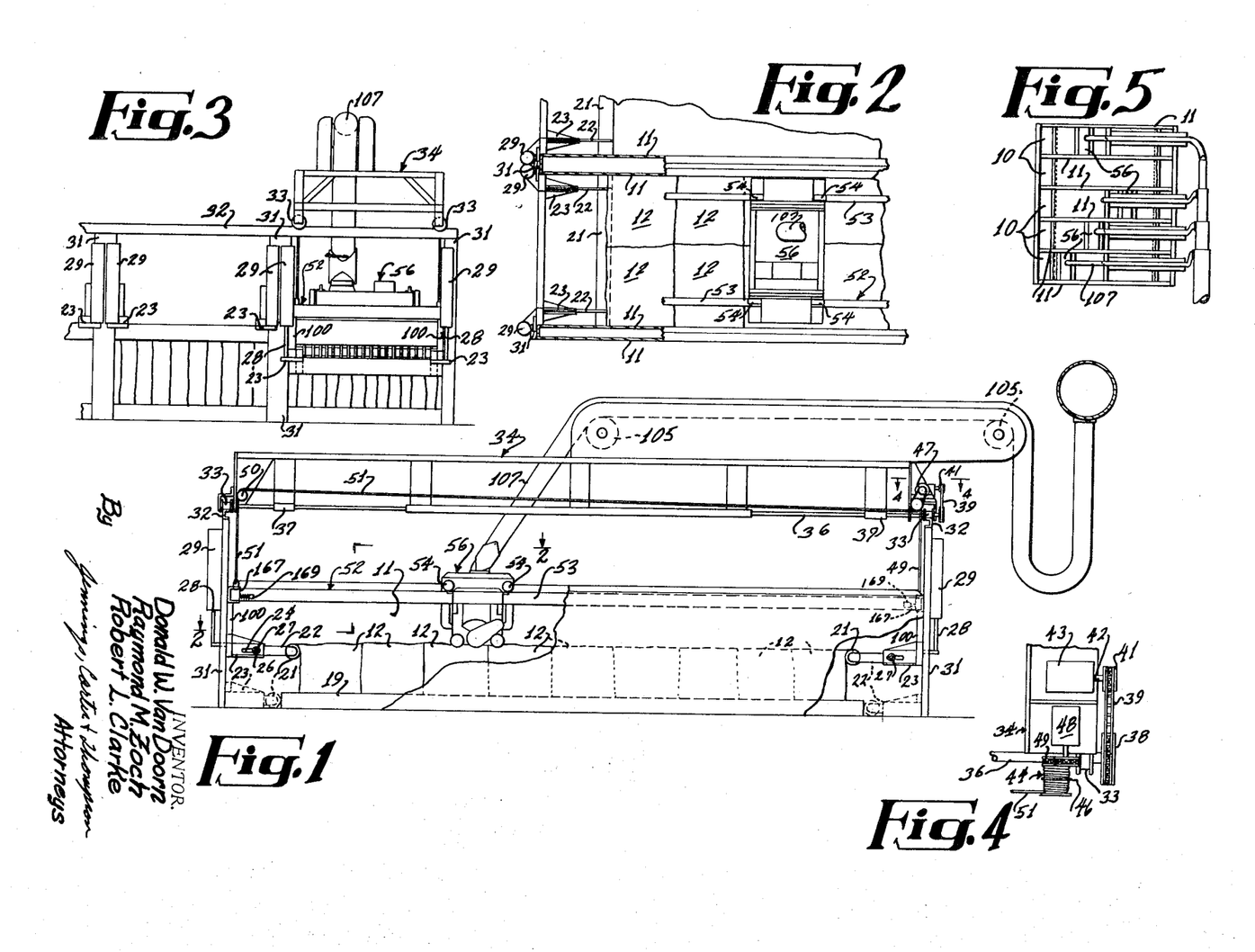
FIG. 1 is a side elevational view, partly broken away, showing the apparatus in operation.
FIG. 2 is a sectional view taken generally along the line 2—2 of FIG. 1.
FIG. 3 is a front elevational view of the apparatus shown in FIG. 1, partly broken away.
FIG. 4 is an enlarged, fragmental view taken generally along the line 4—4 of FIG. 1.
FIG. 5 is a top plan view of the apparatus shown in FIG. 1 drawn to a smaller scale and showing a plurality of bins for receiving aligned rows of bales with the number of plucking units being one less than the number of bins.
Figures 14, 15:
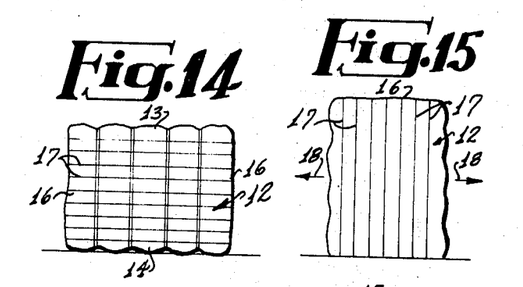
FIG. 14 is a side elevational view showing diagrammatically the position of the layers of fibers with the bale in the position that it is formed within a gin press.
FIG. 15 is a side elevational view showing the bale moved at right angles to the positions shown in FIG. 14 with the layers of fibers forming the bale extending in vertical planes.
Figure 16:
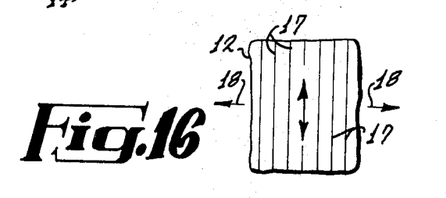
FIG. 16 is a top plan view of the bale shown in FIG. 15 and showing the vertical, parallel relationship of the layers of fibers forming the bale.

Referring now to the drawings for a better understanding of our invention, we show in FIG. 5 a plurality of bins 10, each having vertical side walls 11 which limit outward movement or expansion of the bales within the bins. Each bin 10 is elongated and adapted to accommodate an aligned row or rows consisting of individual bales 12. In FIGS. 1 and 2, we show each bin 10 as being of a size to accommodate two aligned rows of bales 12, there being nine individual bales 12 in each row. As shown in FIG. 14, the bale as formed in the gin press comprises a top 13, a bottom 14 and sides 16. The layers of fibers forming the bale extend in horizontal planes parallel to each other, as shown in FIG. 14. The bales 12 are positioned in the bins 10 on their sides 16 whereby the individual layers 17 extend in vertical planes and parallel to each other, as shown in FIGS. 15 and 16. The bottom tie of each bale is removed before the bale is set in the bin 10 and the bagging on the lower end of the bale is pulled up so that, when the bale is set down, the bagging is not trapped therebeneath. The ties are then released one at a time from the bottom up and the bagging is lifted off the bale as the ties are released. With the ties thus released, the bales 12 expand laterally in the direction of the arrows 18 against the sides 11 of the bin. With high density bales, an air hose or other suitable means may be used to balloon the bales up whereby they are expanded against the sides 11 of the bins 10. As shown in FIG. 1, the bottoms of the bales 12 rest on a suitable bottom plate-like member 19.

To limit endwise movement of the bales 12 within the bins 10 and to prevent mushrooming of the ends of the bales at the end of each row of bales, we provide elongated bar-like members 21 which are adapted to engage the outer surface of the endmost bales in each row of bales subjacent the upper surface thereof, as shown in FIG. 1. Each bar-like member 21 is supported by horizontal members 22 which are mounted for sliding movement relative to horizontal support brackets 23. An elongated slot 24 is provided in each bracket 23 for receiving an outwardly projecting threaded member 26 which is held in selected positions relative to bracket 23 by a nut 27. Each bracket 23 is secured to the lower end of a piston rod 28 of a fluid pressure operated cylinder 29 whereby the bracket 23 and the bar-like members 21 may be moved to the dotted line position shown in FIG. 1 upon introduction of fluid under pressure into the upper end of the cylinder 29. Accordingly, as the bales are positioned within the bin 10, fluid under pressure is introduced into the upper ends of cylinders 29 to retain the bar-like members 21 in the lower dotted line position. However, during operation of the apparatus, the brackets 23 and the bar-like members carried thereby are urged upwardly by introducing fluid adjacent the lower end of cylinders 29. As the fibers are removed from the upper surface of the bales 12, the bar-like members 21 move downwardly whereby they remain subjacent the upper surface of the bales, as shown in FIG. 1.

Mounted adjacent opposite ends of the bins 10 are a plurality of upstanding frame members 31. Secured rigidly to the upper ends of the members 31 are channel-like track members 32 which extend transversely along opposite ends of the bins 10, as shown in FIG. 1. Mounted for movement along the trackways 32 are flanged wheels 33 of a movable frame indicated generally at 34. At least one pair of oppositely disposed flanged wheels 33 are secured rigidly to an elongated shaft 36 which is mounted for rotation in suitable bearings 37 carried by the movable frame 34. Mounted nonrotatably on the shaft 36 is a drive sprocket 38 which is operatively connected by a chain 39 to a drive sprocket 41 mounted on the drive shaft 42 of a motor 43. Accordingly, upon reversing the direction of rotation of the motor 43, the movable frame 34 may be moved along the trackways 32 to position the elongated frame 34 in alignment with selected ones of the bins 10.

Mounted on the movable frame 34, as shown in FIG. 4, is a winch unit 44 which is divided into two sections by a disc member 46. The winch unit 44 is operatively connected by a chain drive unit 47 to a reversible motor 48 whereby rotary motion may be imparted to the winch 44 in opposite directions. Cable-like members 49 and 51 are secured to the winch 44 at opposite sides of the disc 46, as shown in FIGS. 1 and 4. The lower end of cable-like member 49 is secured to the subjacent end of a head frame 52. The cable-like member 51 extends toward the opposite ends of the movable frame 34 and passes over a pulley 50 with the lower end of cable 51 being secured to the opposite end of head frame 52 from the end thereof secured to cable-like member 49. Accordingly, upon rotating the winch 44 in opposite directions, the head frame 52 is raised and lowered relative to the bales 12 positioned therebeneath.

Figure 7:
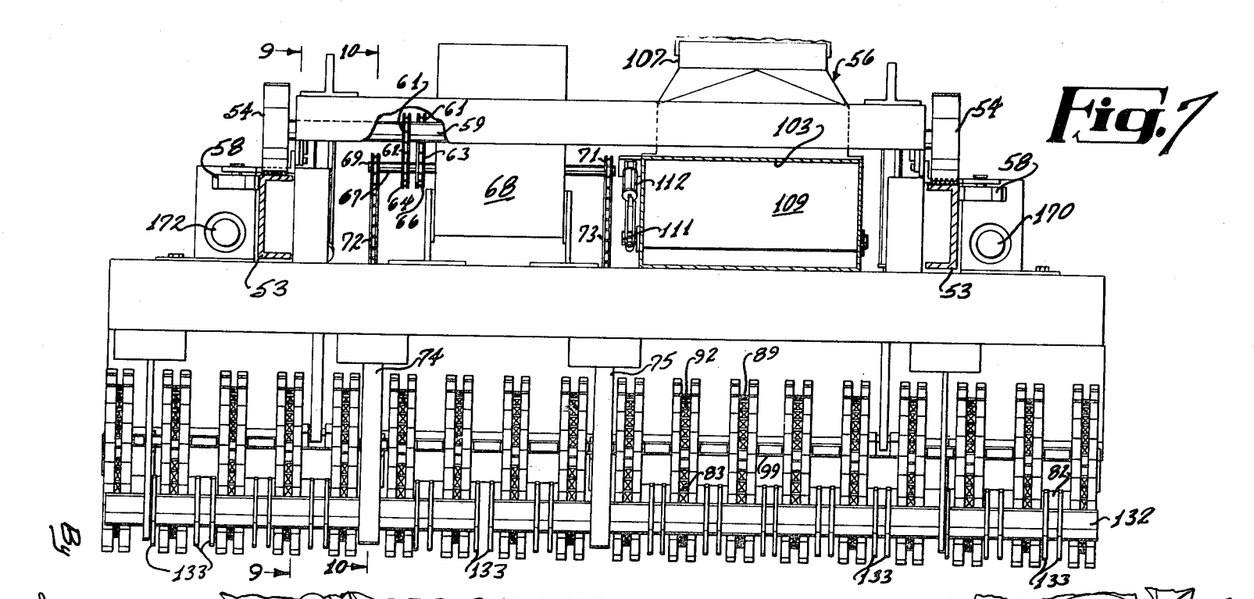
FIG. 7 is a sectional view taken generally along the line 7—7 of FIG. 6.

The head frame 52 comprises a pair of spaced apart, parallel trackways 53 which are in position to support wheels 54 carried by a movable plucker frame 56. Mounted at opposite sides of the plucker frame 56 by suitable brackets 57 are retaining rollers 58 which are in position to engage the outer sides of the channel-like trackways 53, as shown in FIGS. 6 and 7 to thus limit lateral movement of the plucker frame 56 relative to the trackways 53. The wheels 54 are mounted on shafts 59, each of which has a drive sprocket 61 mounted nonrotatably thereon. The drive sprockets 61 are operatively connected by drive chains 62 and 63 to sprockets 64 and 66, respectively, mounted on a drive shaft 67 of a reversible motor 68. Mounted nonrotatably adjacent opposite ends of the shaft 67 are drive sprockets 69 and 71 for endless sprocket chains 72 and 73, respectively.

Figure 8:
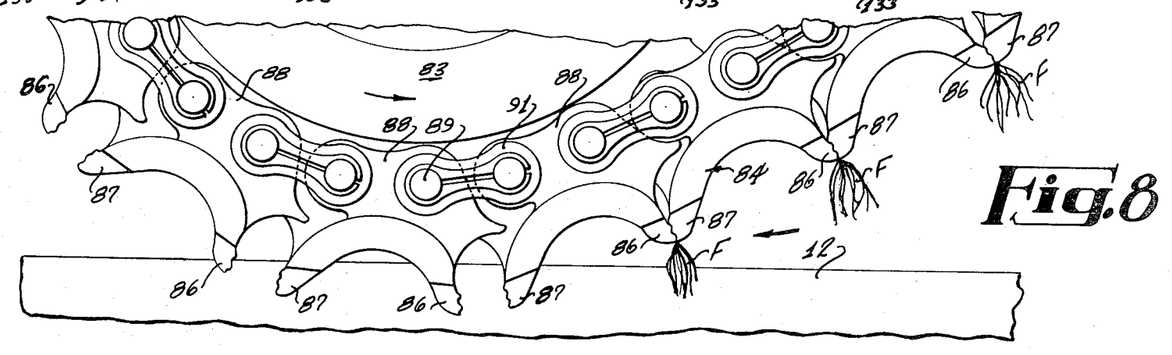
FIG. 8 is an enlarged, fragmental view showing the individual plucking members and the manner in which the fibers are removed from a bale.
Figures 9, 10, 11, 12:
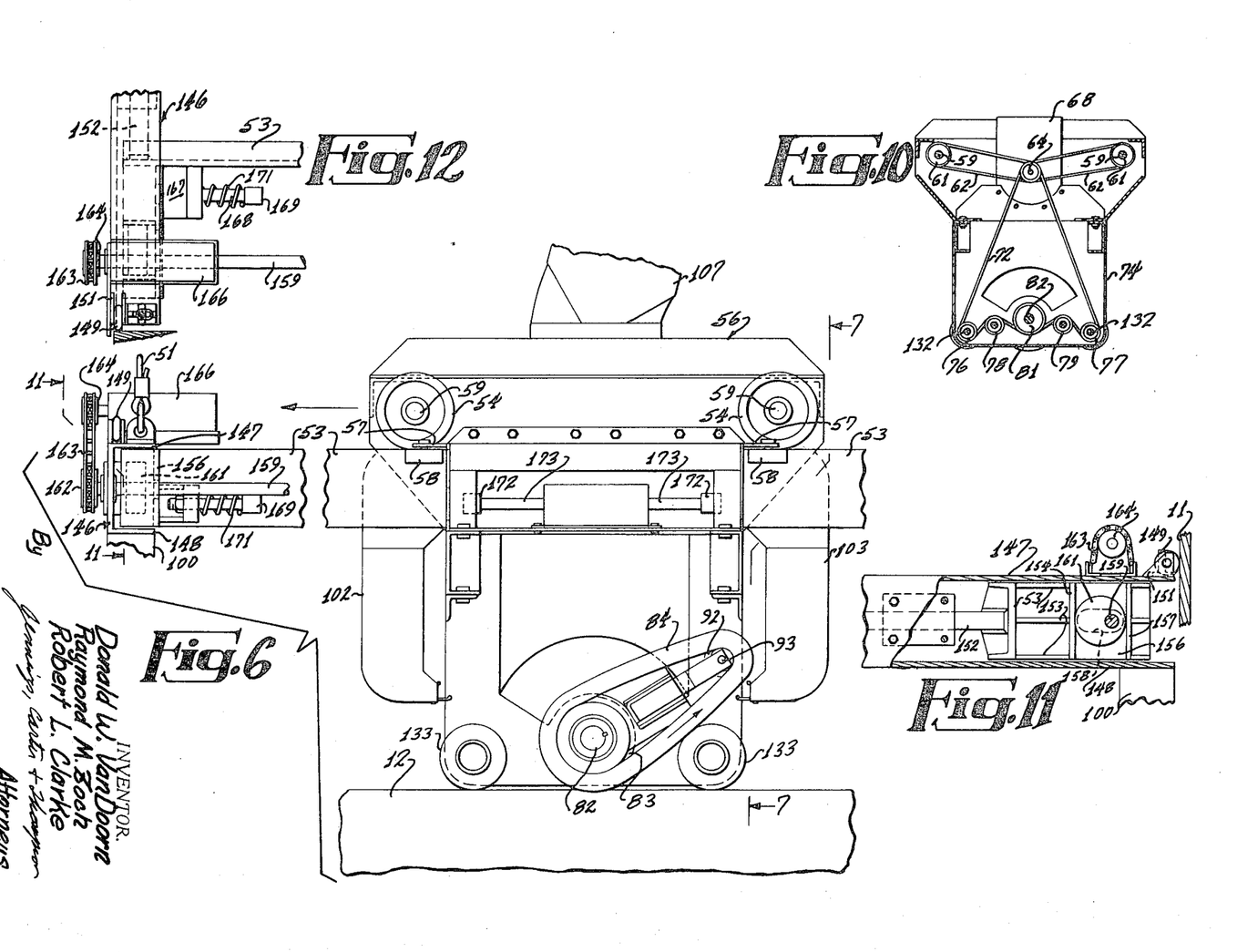
FIG. 9 is an enlarged, sectional view taken generally along the line 9—9 of FIG. 7.
FIG. 10 is a sectional view taken generally along the line 10—10 of FIG. 7 and drawn to a smaller scale.
FIG. 11 is a fragmental view, partly in section, taken generally along the line 11—11 of FIG. 6.
FIG. 12 is a fragmental plan view of the apparatus shown in FIG. 11.
Figure 9:
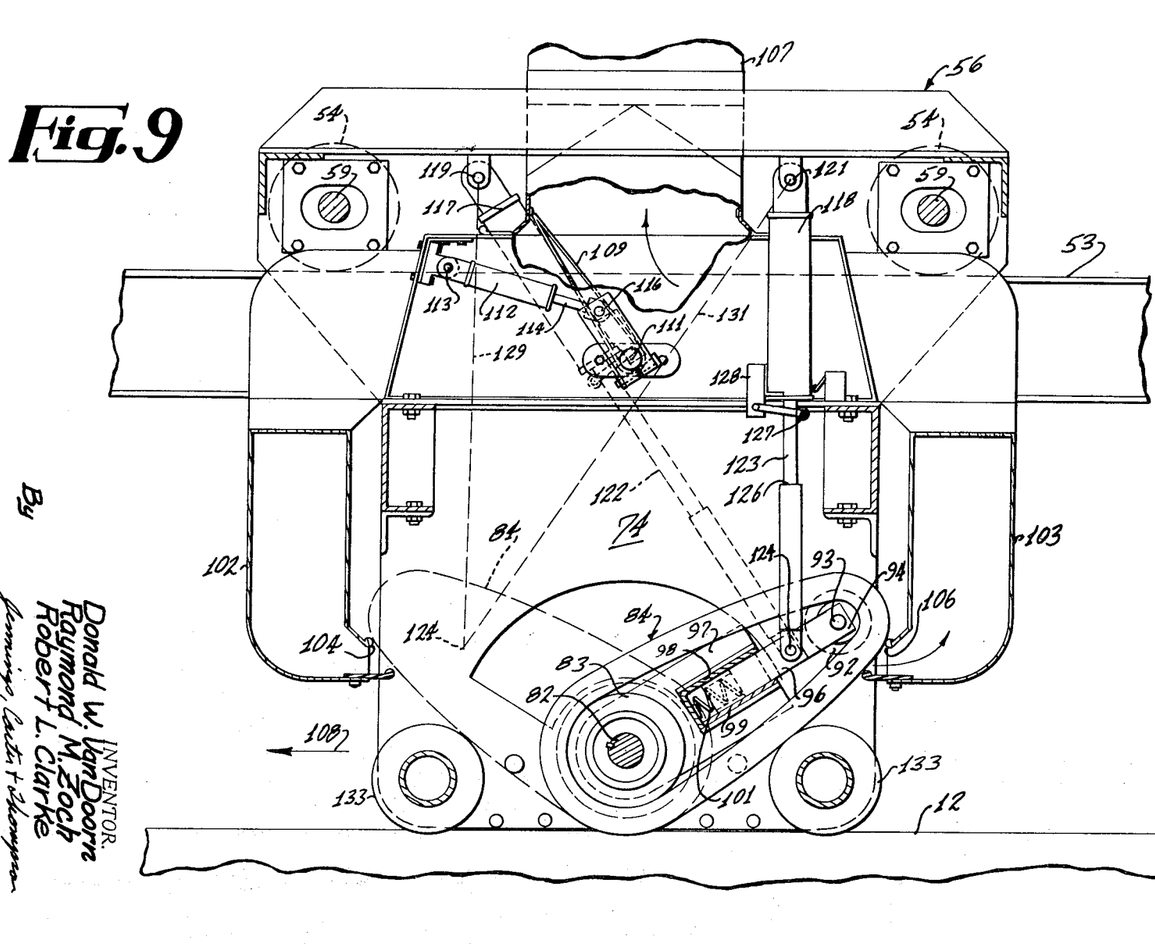

As shown in FIGS. 7 and 10, the endless sprocket chains 72 and 73 extend downwardly within housings 74 and 75, respectively. The chains 72 and 73 pass around sprockets 76 and 77 located adjacent opposite ends of the housings 74 and 75, as shown in FIG. 10. The chains 72 and 73 also pass over idler sprockets 78 and 79 and under a centrally disposed sprocket 81 mounted on a shaft 82. As shown in FIG. 7, the shaft 82 extends the entire length of the plucker frame 56 and mounted on shaft 82 in longitudinally spaced relationship to each other are a plurality of sprockets 83. Passing around each sprocket 83 is a fiber pickup member 84 which is in the form of a flexible chain-like member which is movable relative to the upper surface of the row of bales 12. The flexible chain-like members 84 have cooperating pairs of jaws 86 and 87 which extend outwardly, as shown in FIG. 8. That is, the flexible chain-like member 84 comprises a plurality of individual link elements 88, each of which carries jaws 86 and 87 which are adapted to cooperate with adjacent jaws 87 and 86, respectively, to pick up and remove tufts of fiber F, as shown in FIG. 8. Adjacent link elements 88 are pivotally connected by pins 89 to outside links 91 whereby the link elements 88 are adapted to move relative to each other to open and close the cooperating jaws 86 and 87.

Each flexible chain-like member 84 passes around a sprocket 92 mounted on a stud shaft 93 which is supported by a yoke-like member 94 carried by a link 96, as shown in FIG. 9. Surrounding the shaft 82 and extending outwardly and upwardly therefrom are a plurality of plate members 97 having outwardly opening U-shaped recesses 98 therein for receiving a U-shaped member 99 which extends transversely of the plucker frame 56 in position to receive the lower ends of links 96, as shown in FIG. 9. A compression spring 101 is interposed between the lower end of link 96 and the bottom of the U-shaped member 99 whereby the sprockets 83 and 92 are urged away from each other to exert a predetermined pressure on the jaws 86 and 87 whereby noncompressible objects do not exert excessive pressures on the jaws to cause damage thereto.

As the flexible chain-like members move around the sprockets 83 and 92 they are flexed to position adjacent portions of the chain-like members in an outer convex configuration whereby the jaws 86 and 87 move away from each other while the chain-like members are thus flexed. On the other hand, while the chain-like members 84 are not flexed the jaws 86 and 87 remain in contact with each other. Accordingly, as the chain-like members 84 are flexed in their movement about the sprockets 83, the jaws 86 and 87 move away from each other prior to engaging the subjacent bale 12 to thus receive tufts of fiber F therebetween. As the chain-like members 84 leave the sprockets 83, they move to an unflexed position whereupon the jaws 86 and 87 move into engagement with each other to thus grip the tufts of fibers F whereupon they are removed from the bale 12 and are not released until the tufts of fibers F reach the sprockets 92 whereupon the chain-like members 84 are again flexed to move the jaws to open position relative to each other.

Mounted at each side of the plucker frame 56 are depending plenum chambers 102 and 103 having inlet openings 104 and 106 adjacent the lower inner end thereof, as shown in FIG. 9. The upper ends of the plenum chambers 102 and 103 communicate with a flexible discharge conduit 107 which passes over suitable supporting rolls 105 carried by the movable frame 34. The tufts of fibers F thus released from the jaws 86 and 87 as the flexible members passes around the sprocket 92 are pneumatically doffed and then conveyed through the flexible discharge conduit 107 to other processes and apparatus in a manner well understood in the art to which our invention relates.

Depending members 100 are carried by the head frame 52 in position to engage the brackets 23 and thus maintain the elongated bars 21 subadjacent the surface of the bales 12 as the plucker frame 56 moves downwardly. It will be noted that FIG. 1 shows a substantial portion of the bales 12 as already removed.

Each time the direction of travel of the plucker frame 56 is reversed, the endless, flexible drive chain 84 is moved selectively from the solid line position to the dotted line position shown in FIG. 9. That is, with the plucker frame 56 traveling in the direction of arrow 108, the flexible chain-like member 84 is in the solid line position whereby the tufts of fibers F are doffed into the plenum chamber 103 and are then conveyed upwardly to the flexible discharge conduit 107. On the other hand, with the apparatus moving in the opposite direction from the arrow 108, the flexible chain 84 is moved to the dotted line position and the direction of rotation of the flexible chain 84 is reversed whereby the tufts of fibers are delivered adjacent the receiving opening 104 of the plenum chamber 102 whereupon the fibers are doffed and conveyed upwardly to the discharge conduit 107.

As shown in FIG. 9, a plate-like valve member 109 is mounted for pivotal movement about a shaft 111 from a position adjacent one side of the conduit 107 to the opposite side thereof whereby the tufts of fibers are conveyed to the conduit 107 selectively from the plenum chambers 102 and 103. That is, while the fibers are delivered to the plenum chamber 103, the plate-like valve member 109 is in the position shown in FIG. 9. On the other hand with the tufts of fibers being doffed into the plenum chamber 102, the plate-like valve 109 is moved to the opposite side of conduit 107 to thus permit free flow of fibers from plenum chamber 102 to the discharge conduit 107. The plate-like valve member 109 is moved to selected positions by a fluid pressure operated cylinder 112 which is pivotally connected as at 113 to the plucker frame 56. The piston rod 114 of the cylinder 112 is pivotally connected as at 116 to the plate-like member 109, as shown.

The chain-like member 84 is moved selectively from the solid line position shown in FIG. 9 to the dotted line position by a pair of fluid pressure operated cylinders 117 and 118 which are pivotally connected as at 119 and 121, respectively, to the plucker frame 56, as shown in FIG. 9. The cylinders 117 and 118 are provided with piston rods 122 and 123 which are pivotally connected by a pin 124 to the link 96. Accordingly, upon retracting the piston rods 122 and 123, the pivot pin 124 is moved upwardly and inwardly until an abutment 126 carried by piston rod 123 engages a roller 127 that actuates a switch unit 128 which in turn introduces fluid under pressure into the cylinders 117 and 118 to extend the piston rods 122 and 123 whereupon the flexible chain-like member 84 moves to the dotted line position shown in FIG. 9. The cylinders 117 and 118 thus moved to positions indicated by dotted lines 129 and 131, respectively.

The sprockets 76 and 77 are mounted on elongated shafts 132 which are mounted for rotation at opposite sides of the sprockets 83, as shown in FIG. 10. Mounted on the shafts 132 are a plurality of longitudinally spaced disc-like members 133 which engage the upper surface of the bale 12 at opposite sides of the fiber pickup means to prevent large masses of fibers from being removed from the upper surface of the bales 12.

Figure 17:
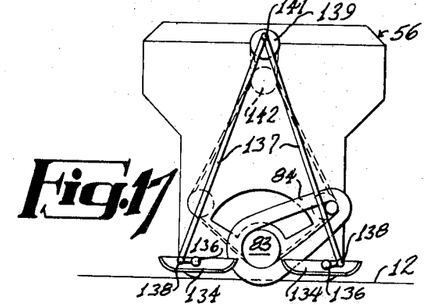
FIG. 17 is a fragmental view showing a modification of the means for retaining the fibers in place at opposite sides of the members which remove fibers from the bale; and, FIG. 18 is a fragmental view showing a further modification of the means for holding the fibers down at opposite sides of the members which remove fibers from the bales.

In FIG. 17 of the drawings, we show a modified form of our invention wherein foot-like members 134 are pivotally mounted on pins 136 adjacent opposite sides of the sprocket 83, as viewed in the direction of travel of the plucker frame 56 relative to the upper surface of the bale 12. Pivotally conneected to the foot-like members 134 in spaced relation to the pivot pins 136 are elongated links 137. The lower ends of the links 137 are connected to the foot-like members 134 by pivot pins 138 and the upper ends of links 137 are eccentrically connected to a rotary member 139 by a pin 141. Rotary motion is imparted to the rotary member 139 by a suitable drive indicated generally at 142. Upon rotation of the rotary member 139, the foot-like members 134 are moved about the pivot pin 136 to permit relative movement of the members 134 and the bale 12 and still hold the subjacent cotton down and thus limit the amount of fiber removed by the fiber pickup means.

Figure 18:
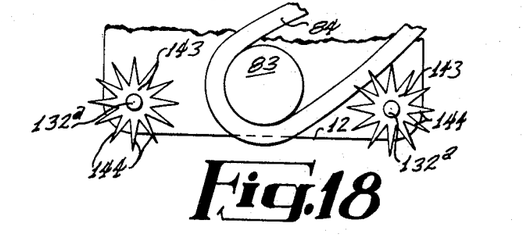

In FIG. 18, we show another modified form of our invention in which the means for holding the fibers down adjacent opposite sides of the fiber pickup means comprises rotary members 143 having outwardly projecting teeth-like members 144 thereon which are adapted to engage the bales at opposite sides of the fiber pickup means to aid in opening the bales as well as to limit the amount of fibers removed by the fiber pickup means.

Secured to and extending transversely of the trackways 53 at opposite ends of the head frame 52 are elongated channel members 146 having upper flanges 147 and lower flanges 148, as shown in FIGS. 6 and 11. Mounted at opposite ends of the upper flange 147 in position to engage the vertical walls 11 of the bins 10 are rollers 149 which are mounted in suitable brackets 151, as shown.

Mounted within and connecting the trackways 53 to each other is an elongated rod 152 whereby the trackways 53 are adapted to move as a unit relative to the channel members 146 at opposite ends of each trackway. Secured to the ends of each trackway 53 by horizontal members 153 is a vertical plate 154. Secured to the plate 154 and extending normal thereto is a vertical plate 156 which in turn is secured to another vertical plate 157 which extends generally parallel to plate 154. Mounted for rotation in an elongated slot 158 provided in the vertical plate 156 is a shaft 159. Mounted nonrotatably on the shaft 159 between the vertical plates 154 and 157 is a cam member 161 which oscillates the plates 154 and 156 and the trackways 53 connected thereto back and forth as the cam is rotated. Secured to the end of shaft 159 is a sprocket 162 which is operatively connected by a sprocket chain 163 to a sprocket 164 which is mounted on the drive shaft of a motor 166.

The motor 166 is driven at a predetermined speed to move the fiber pickup means carried by the plucker frame 56 laterally of the upper surface of the bale 12 whereby successive paths of movement of the fiber pickup means are not the same. Accordingly, the tufts of fiber F are removed sequentially from the adjacent surface of the bales 12 along a plurality of successive paths with no two adjacent paths being the same.

Secured to the transverse channel members 146 at opposite ends of the trackways 53 are control units indicated generally at 167. Projecting outwardly of the control unit 167 is a rod 168 having a head 169 at the free end thereof. Surrounding the rod 168 intermediate the head 169 and the control unit 167 is a compression spring 171 which urges the head 169 outwardly in position to engage an actuating head 172 mounted at the ends of elongated members 173 carried by the plucker frame 56, as shown in FIG. 6.

To prevent the plucking teeth or jaws 86 and 87 from continuously coming down at the same transverse location of the upper surface of the bales 12, the linear speed of movement of the plucker frame 56 is different from the surface speed of the plucker jaws 86 and 87 whereby movement of the fiber pickup means is out of phase with longitudinal movement of the plucker frame. In actual practice, we have found that by driving the plucker frame 56 at a speed approximately five percent faster than the surface speed of the plucker jaws prevents corrugation of the upper surface of the bale since the plucker jaws 86 and 87 do not continuously engage the surface of the bale at the same transverse location.

As shown in FIG. 5, we provide a plurality of plucker units 56 which are adapted to move longitudinally over a plurality of bins 10. However, we usually provide at least one more bin 10 than the number of plucker units 56, the spare bin being loaded while the others are being used whereby the operation may be substantially continuous. While we have shown only one spare bin, it will be apparent that any desired number of spare bins may be employed.

The sprocket 92 is positioned at an elevation above sprocket 83 whereby the point of release of the tufts of fiber F from the plucker jaws 86 and 87 is positioned above the surface of the bale 12 a distance at least as great as the length of the individual fibers forming the tufts. By providing this distance, the fibers do not become twisted about rotating parts.

Figure 13:
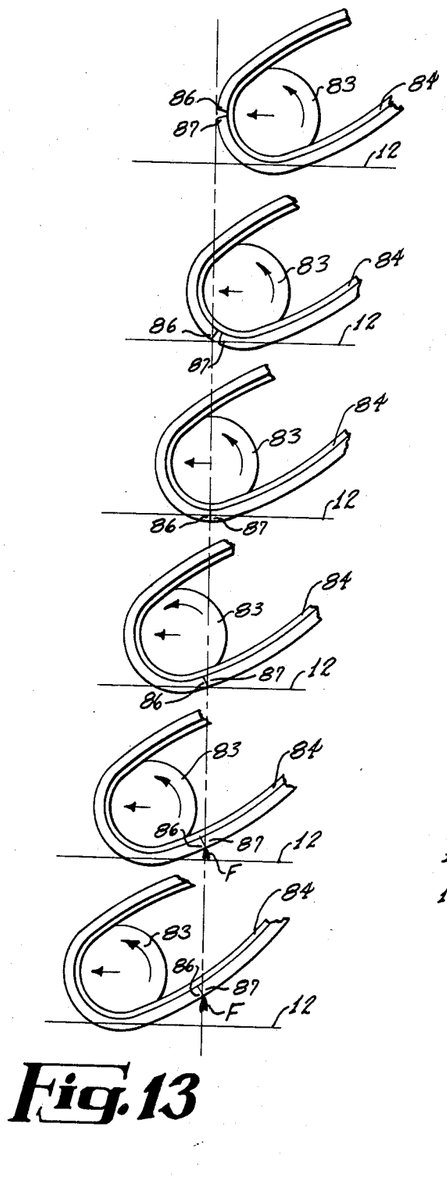
FIG. 13 is a diagrammatic view showing the relative positions of an individual plucking member and the surface from which the fibers are removed.

As shown in FIG. 13, the relative movement between the plucker frame 56 and the adjacent surface of the bale 12 and the movement of the plucking jaws 86 and 87 is synchronized so that at the time the tufts F are removed there is substantially no relative movement of the tufts F and the surface from which they are removed in a plane generally parallel to the adjacent surface of bale 12. Accordingly, the tufts F are removed from the adjacent surface of the row of bales 12 in a direction substantially perpendicular to the adjacent surface of the bales. That is, at the times the tufts of fibers F are removed from the adjacent surface of the bales 12, the plucking jaws 86 and 87 are traveling rearwardly at substantially the same speed that the plucker frame 56 is traveling forwardly whereby there is no relative movement in a plane parallel to the adjacent surface of the bales.

From the foregoing description, the operation of our improved apparatus and the manner in which our improved process is carried out will be readily understood. The bales 12 are placed within the bins 10 on their sides with the bail ties extending in a horizontal plane whereby the individual layers of fibers forming the bale extend in vertical planes parallel to the direction of movement of the plucker frame 56 relative to the bales. The bottom tie is removed before the bale is set in the bin and the bagging on the lower end of the bale is pulled up whereby the bagging is not trapped therebeneath. Upon release of the ties one at a time ,the bagging is lifted off the ties. Upon release of the ties, the bale expands in the direction of the arrow 18 against the sides 11 of the bins 10.

The movable frame 34 carrying the plucker unit 56 is moved over the proper bin 10 and the plucker unit 56 is lowered into position on top of the bales 12, as shown in FIG. 1 by energizing motor 48. The reversible motor 68 is energized whereby the plucker unit 56 moves toward one end of the trackway 53. Upon reaching the end of the trackway 53, a member 172 carried by the plucking unit 56 engages the adjacent head 169 thus actuating the control unit 167 which in turn reverses the direction of rotation of motor 68 and actuates the plate-like valve 109 whereby it is moved to the opposite side of discharge conduit 107 to thus receive fibers from the proper plenum chamber 102 or 103, as the case may be. Also, each time the control unit 167 is actuated, fluid under pressure is introduced into the lower ends of cylinders 117 and 118 whereby the piston rods 122 and 123 are retracted until roller 127 closes a switch in unit 128 to thus introduce fluid into the opposite or upper end of cylinders 117 and 118 whereupon the cylinders are extended to thus move the endless, flexible chain unit 84 selectively from the solid line position to the dotted line position shown in FIG. 9. Also, upon actuating control unit 167, motor 48 is energized to lower cables 49 and 51 whereby the trackways 53 and the plucker unit 56 carried thereby are lowered a predetermined distance each time the plucker unit reaches the end of its travel along the trackways 53.

As shown in FIG. 7, it is only necessary to provide one actuating head 172 at each end of the plucker frame 56. A suitable shock absorber 170 is provided at the opposite side of the plucker frame in position to engage a suitable stop mounted on the transverse channel members 146.

As the chain-like member 84 passes beneath the sprocket 83, it flexes whereby the jaws 86 and 87 move outwardly away from each other prior to engaging the upper surface of the bale 12 whereby the fibers forming the bale 12 enter the space between adjacent teeth or jaws 86 and 87. Upon leaving the sprocket 83, the chain 84 moves to an unflexed position whereup the jaws 86 and 87 immediately move toward each other to grasp the tufts of fibers F therebetween whereupon the fibers are conveyed upwardly until the chain 84 flexes around the sprocket 92. As chain 84 flexes about sprocket 92, the jaws 86 and 87 move away from each other to thus release the tufts of fibers whereupon they are doffed and conveyed upwardly through the plenum chambers 102 or 103, as the case may be, and thence upwardly through the discharge conduit 107.

As the plucker frame 56 moves back and forth over the aligned row of bales 12, the tufts of fibers are removed sequentially from the adjacent surface of the bales along the plurality of successive paths with no two adjacent paths being the same due to the fact that motor 166 continuously imparts rotation to the cam 161 which causes the tracks 53 to move transversely relative to the bales 12. In actual practice, we have found that our apparatus operates satisfactorily in every respect where one pound of cotton fibers requires approximately 3070 plucks or tufts of fibers. That is, each tuft or pluck weighs approximately 0.14 gram.

From the foregoing, it will be seen that we have devised an improved process and apparatus for plucking tufts of fibers from bales thereof. By gently removing each tuft of fibers F from the adjacent surface of the bale in a direction generally perpendicular to the bale without any relative movement of the tuft and the surface in a plane parallel to the surface, there is no damage to the fibers thus removed. By removing the fibers from the top of the bales rather than underneath the bales, together with the provision of improved means for regulating the rate of feed, the fibers are removed at a constant rate which does not vary as the bales decrease in weight. Also, by providing a fiber pickup unit which traverses along the surface of a plurality of bales which are so positioned that the fiber removal apparatus travels in a direction parallel to the vertical layers of fibers forming the individual bales, the fibers are removed across an entire side of the bale which represents all the different conditions of the fibers in the bale. Accordingly, we assure a more complete and uniform blend of the greatly variable conditions of the fibers in the bale. Furthermore, by providing one or more spare bins than the number of plucker units, we provide for a substantially continuous supply of fibers whereby a uniform blend is obtainable at all times. Furthermore, by removing the fibers from the top surface of the aligned row of bales, foreign objects, such as bale ties, wires, buckles, bagging and the like will not damage our apparatus since our improved apparatus rejects such objects whereby they are left lying on the floor of the bin. Furthermore, by providing a plurality of bins and plucker heads, our apparatus is extremely flexible in that it is adaptable to many mill conditions since a minimum of floor space is required and the number of bins can be readily changed to accommodate columns or other obstructions.

While we have shown our invention in several forms, it will be obvious to those skilled in the art that it is not so limited, but is susceptible of various other changes and modifications without departing from the spirit thereof.

What we clam is:

1. The process of plucking tufts from at least one bale of fibers comprising the steps of:
   (a) passing fiber pickup means adjacent and parallel to a surface of said bale, and
   (b) removing tufts from said surface of said bale in a directioin perpendicular to said surface concimitantly with continuously passing said fiber pick-up means parallel to said surface preventing, at the time the tufts are removed, relative movement between the tufts being removed and the surface from which the tufts are removed in a plane parallel to said surface.

2. The process of plucking tufts from at least one bale of fibers as defined in claim 1 in which the tufts are removed sequentially from the bale along a plurality of successive paths.

3. The process of plucking tufts from at least one bale of fibers as defined in claim 1 in which the bale is positioned so that individual layers of fibers forming the bale extend in vertical planes and the fiber pick-up means moves generally parallel to said layers.

4. The process of plucking tufts from at least one bale of fibers as defined in claim 1 in which the tufts are removed from the upper surface of said bale.

5. In apparatus for plucking tufts from at least one mass of fibers:
   (a) a frame mounted adjacent a surface of said mass,
   (b) means imparting relative movement between said frame and said surface in a direction parallel to said surface, and
   (c) movable fiber pick-up means carried by said frame movable concomitantly with and synchronized with movement of said means imparting relative movement between said frame and said surface to remove fibers in a direction perpendicular to said surface and said direction of relative movement between said frame and said surface preventing, at the time fibers are removed, relative movement between said fibers being removed, and said surface in a plane parallel to said surface.

6. In apparatus as defined in claim 5 in which means is also provided to impart relative movement between said frame and said surface toward each other at a controlled rate and in a direction generally perpendicular to said surface.

7. In apparatus as defined in claim 5 in which said frame is supported by elongated trackways and a plurality of aligned rows of contiguous bales of fibers are mounted in a plurality of generally parallel bins and transverse trackways are mounted adjacent opposite ends of said bins for supporting opposite ends of said elongated trackways so that said frame is adapted for movement to selected bins.

8. In apparatus for plucking tufts as defined in claim 5 in which the fiber pick-up means comprises:
   (a) flexible members movable relative to said surface of the mass and having cooperating pairs of jaws extending outwardly therefrom and disposed to move apart while said flexible members are flexed to position adjacent portions thereof in an outer convex configuration and disposed to move together while adjacent portions of said flexible members are unflexed,
   (b) means to flex the portions of said flexible members adjacent said surface in an outer convex configuration relative thereto so that said jaws move apart and receive therebetween tufts of fibers from said surface, and
   (c) means to move the flexed portions of said flexible members to an unflexed position while the tufts of fibers are still between said jaws to move the jaws together and thus grasp tufts of fibers for removal from said surface.

9. In apparatus for plucking tufts as defined in claim 8 in which said flexible members are endless power driven members which pass around sprocket-like members and resilient means is interposed between said sprocket-like members to exert a predetermined pressure on said jaws so that non-compressible objects do not exert excessive pressures on said jaws.

10. In apparatus for plucking tufts as defined in claim 9 in which said endless power driven members are mounted for pivotal movement about a sprocket-like member adjacent said surface, and actuating means is carried by said frame to move said endless power driven members to opposite sides of its pivot point each time the direction of movement is reversed.

11. In apparatus for plucking tufts as defined in claim 8 in which means is provided to flex the portions of said flexible members carrying tufts of fibers in an outer convex configuration after the tufts of fibers have been removed from said surface so that said jaws release the tufts of fibers.

12. In apparatus as defined in claim 11 in which the point of release of the tufts of fiber from said jaws is positioned above said surface a distance at least as great as the length of the individual fibers forming said tufts.

13. In apparatus for plucking tufts as defined in claim 11 in which the released tufts of fibers are removed by pneumatic doffing means.

14. In apparatus for plucking tufts as defined in claim 5 in which the means to impart relative movement between said frame and said surface comprises:
   (a) a trackway extending generally parallel to said surface of a mass of fibers supporting said frame for longitudinal reciprocatory movement along said trackway, and
   (b) means to move said fiber pick-up means laterally of said trackway and said surface so that successive paths of movement of said fiber pick-up means are not the same.

15. In apparatus for plucking tufts as defined in claim 14 in which the means to move said fiber pick-up means laterally of said frame comprises:
  (a) a rotary member operatively engaging and reciprocating said fiber pick-up means transversely of said frame, and
  (b) means rotating said rotary member.

16. In apparatus for plucking tufts as defined in claim 5 in which fiber hold-down means is provided at opposite sides of the fiber pick-up means relative to the direction of movement of said fiber pick-up means to limit the amount of fibers removed.

17. In apparatus for plucking tufts as defined in claim 16 in which the hold-down means comprises a plurality of rotary members spaced laterally from each other.

18. In apparatus as defined in claim 17 in which the rotary members are laterally spaced disc-like members.

19. In apparatus as defined in claim 16 in which the hold-down means comprises rotary members having outwardly projecting teeth-like members thereon.

20. In apparatus as defined in claim 16 in which the hold-down means comprises:
  (a) a foot-like member pivotally mounted at each side of said fiber pick-up means for movement in a plane generally perpendicular to said surface from which fibers are removed,
  (b) an elongated actuating member pivotally connected at one end to each foot-like member, and
  (c) a power actuated rotary member eccentrically connected to the other end of said actuating member imparting reciprocatory motion to the actuating members and pivoting each foot-like member about its pivot point.

References Cited

UNITED STATES PATENTS

| | | | |
|---|---|---|---|
| 3,085,296 | 4/1963 | Meinicke | 19—81 |
| 3,157,285 | 11/1964 | Rood | 19—200 XR |
| 3,166,797 | 1/1965 | Mayer | 19—81 |
| 3,208,107 | 9/1965 | Kotter et al. | 19—80 XR |
| 3,251,096 | 5/1966 | Rapp | 19—80 |
| 3,389,435 | 6/1968 | Schwab | 19—80 |
| 3,443,285 | 5/1969 | Goldammer et al. | 19—81 |

FOREIGN PATENTS

| | | |
|---|---|---|
| 168,151 | 7/1965 | U.S.S.R. |

OTHER REFERENCES

Schubert, German application 1,245,815, printed July 27, 1967.

DORSEY NEWTON, Primary Examiner